US012655585B2

(12) United States Patent
Kim et al.

(10) Patent No.: US 12,655,585 B2
(45) Date of Patent: Jun. 16, 2026

(54) COVER FOR ASPHALT INCLUDING ASPHALT EMULSION AND METHOD OF PAVING ASPHALT USING THE SAME

(71) Applicants: ESG Industry Co., Ltd., Daejeon (KR); ESG Construction. Co. Ltd., Gyeryong-si (KR); A-ONE YOO HWA, Ulsan (KR)

(72) Inventors: Hyeong Su Kim, Daejeon (KR); Hyong Ho Nam, Daejeon (KR); Sung Hoon Shim, Ulsan (KR); Hyoung Dong Ko, Gyeongju-si (KR)

(73) Assignees: ESG INDUSTRY CO., LTD., Daejeon (KR); ESG CONSTRUCTION. CO. LTD., Gyeryong-si (KR); A-ONE YOO HWA, Ulsan (KR)

( * ) Notice: Subject to any disclaimer, the term of this patent is extended or adjusted under 35 U.S.C. 154(b) by 769 days.

(21) Appl. No.: 17/990,509

(22) Filed: Nov. 18, 2022

(65) Prior Publication Data

US 2023/0092942 A1 Mar. 23, 2023

Related U.S. Application Data

(63) Continuation of application No. PCT/KR2021/016615, filed on Nov. 15, 2021.

(30) Foreign Application Priority Data

Jun. 29, 2021 (KR) ........................ 10-2021-0084659

(51) Int. Cl.
*E01C 7/32* (2006.01)
*B32B 5/02* (2006.01)
(Continued)

(52) U.S. Cl.
CPC .............. *E01C 7/325* (2013.01); *B32B 5/022* (2013.01); *B32B 27/12* (2013.01); *B32B 27/32* (2013.01);
(Continued)

(58) Field of Classification Search
CPC ......... E01C 7/325; E01C 19/48; B32B 5/022; B32B 7/12; B32B 7/32; B32B 2250/02;
(Continued)

(56) References Cited

U.S. PATENT DOCUMENTS 3,825,513 A * 7/1974 Rostler .................. C09K 17/18
524/60
4,151,025 A * 4/1979 Jacobs .................... B32B 25/18
404/31
(Continued)

FOREIGN PATENT DOCUMENTS

JP 2001138420 5/2001
KR 101427375 8/2014
(Continued)

OTHER PUBLICATIONS

International Search Report—PCT/KR2021/016615 dated Mar. 17, 2022.

*Primary Examiner* — Raymond W Addie
(74) *Attorney, Agent, or Firm* — CANTOR COLBURN LLP

(57) ABSTRACT

Provided is a cover for asphalt including an asphalt emulsion and a method of paving asphalt using the same, and specifically, to a cover for asphalt, which may facilitate adhesion between an existing asphalt pavement layer and a new asphalt pavement layer and substitute for a tack coat. The cover for asphalt prevents an asphalt emulsion from being damaged by heavy vehicles or construction equipment moving for application of a new pavement layer, and allows (Continued)

omitting separate asphalt emulsion application and curing processes before application of the new asphalt layer.

4 Claims, 3 Drawing Sheets

(51) Int. Cl.

| | |
|---|---|
| *B32B 27/12* | (2006.01) |
| *B32B 27/32* | (2006.01) |
| *C04B 16/06* | (2006.01) |
| *C04B 22/12* | (2006.01) |
| *C04B 24/12* | (2006.01) |
| *C04B 24/26* | (2006.01) |
| *C04B 24/28* | (2006.01) |
| *C04B 24/38* | (2006.01) |
| *C04B 26/26* | (2006.01) |
| *E01C 19/48* | (2006.01) |
| *C04B 103/44* | (2006.01) |
| *C04B 111/00* | (2006.01) |

(52) U.S. Cl.
CPC .......... *C04B 16/065* (2013.01); *C04B 22/122* (2013.01); *C04B 22/124* (2013.01); *C04B 24/123* (2013.01); *C04B 24/26* (2013.01); *C04B 24/28* (2013.01); *C04B 24/383* (2013.01); *C04B 26/26* (2013.01); *E01C 19/48* (2013.01); *B32B 2250/02* (2013.01); *B32B 2260/021* (2013.01); *B32B 2260/042* (2013.01); *B32B 2262/0261* (2013.01); *B32B 2307/718* (2013.01); *B32B 2307/7242* (2013.01); *C04B 2103/44* (2013.01); *C04B 2111/0075* (2013.01)

(58) Field of Classification Search
CPC ...... B32B 2260/242; B32B 2262/0261; B32B 2307/718; B32B 2307/7242; C04B 16/065; C04B 22/122; C04B 22/123; C04B 22/124; C04B 24/26; C04B 24/383; C04B 26/26; C04B 2103/44; C04B 111/0075; C04B 2111/0075
USPC ...................................................... 404/17, 31
See application file for complete search history.

(56) References Cited

U.S. PATENT DOCUMENTS

| | | | | |
|---|---|---|---|---|
| 4,708,516 | A * | 11/1987 | Miller ........................ | E01C 7/18 |
| | | | | 404/31 |
| 5,026,609 | A * | 6/1991 | Jacob ...................... | B32B 27/08 |
| | | | | 404/31 |
| 5,419,653 | A * | 5/1995 | Hollon ...................... | E01C 7/34 |
| | | | | 404/82 |
| 5,767,176 | A * | 6/1998 | Nakanishi .............. | D21H 19/62 |
| | | | | 523/420 |
| 6,158,920 | A * | 12/2000 | Malot ................... | E01C 11/005 |
| | | | | 404/31 |
| 6,468,678 | B1 * | 10/2002 | Dahlin .................... | E01F 9/512 |
| | | | | 264/108 |
| 8,038,364 | B2 * | 10/2011 | Newton .................. | B32B 27/12 |
| | | | | 404/31 |
| 2009/0088497 | A1 * | 4/2009 | Sasada .................. | C08L 95/005 |
| | | | | 523/450 |
| 2020/0141068 | A1 * | 5/2020 | Pouteau ................. | F24T 10/10 |

FOREIGN PATENT DOCUMENTS

| | | |
|---|---|---|
| KR | 20170033591 | 3/2017 |
| KR | 20170111650 | 10/2017 |
| KR | 101879347 | 7/2018 |
| KR | 101906757 | 12/2018 |
| KR | 101994155 | 6/2019 |

* cited by examiner

Melting Point ( KS M ISO 11357-3 : 2011 ) : ℃

|  | #1 |
|---|---|
|  | 110.4 |

Note) Temperature range: (40~300)℃
Temperature rise rate: 20 ℃/min
Test instrument: DSC

FIG. 3

Melting Point ( KS M ISO 11357-3 : 2011 ) : ℃

| | #1 |
|---|---|
| | 129.8 |

Note) Temperature range : (30~300)℃
Temperature rise rate: 20 ℃/min
The test method was applied at the request of the client.

FIG. 4

Melting Point ( KS M ISO 11357-3 : 2011 ) : ℃

| | #1 |
|---|---|
| | 123.5 |

Note) Temperature range: (40~300)℃
Temperature rise rate: 20 ℃/min
Test instrument:  DSC

COVER FOR ASPHALT INCLUDING ASPHALT EMULSION AND METHOD OF PAVING ASPHALT USING THE SAME

TECHNICAL FIELD

The present invention relates to a cover for asphalt including an asphalt emulsion and a method of paving asphalt using the same. Specifically, the present invention relates to a cover for asphalt, which may facilitate adhesion between an existing asphalt pavement layer and a new asphalt pavement layer and substitute for a tack coat, and a method of paving asphalt using the same without tack coat application. The cover for asphalt according to the present invention may prevent the asphalt emulsion from being damaged by heavy vehicles or construction equipment moving for application of a new pavement layer, and allows omitting separate asphalt emulsion application and curing processes before application of the new asphalt layer.

BACKGROUND ART

For road pavement, cement concrete pavement or asphalt concrete (Ascon) pavement is mainly applied. Cement concrete pavement refers to a pavement constructed by applying a cement concrete layer to a roadbed composed of granular materials such as crushed stone, and is widely used because of its good suitability for heavy vehicles and its long service life. However, cement concrete pavement has disadvantages in that the curing time is long and processes such as joint construction are very complicated. In addition, cement concrete pavement has problems in that periodic maintenance and repair of the joint is required, which is time-consuming and cost-ineffective, and riding comfort is poor due to noise, the joint and the like. Due to these problems, cement concrete pavement is hardly applied to city roads with a lot of traffic, and the use thereon on highways is also gradually decreasing.

Asphalt pavement refers to a pavement constructed by covering the road surface with an asphalt mixture, and it has relatively low suitability for heavy vehicles compared to cement concrete pavement, and frequently undergoes plastic deformation, cracking, pothole damage, etc. In addition, asphalt pavement has problems in that it has a short service life and requires frequent repair. However, asphalt pavement is constructed in a rapid, simple and convenient manner and requires low maintenance and repair costs, and thus is used in many places, such as urban roads. Asphalt pavement accounts for more than 90% of road pavement.

According to "KCS 44 50 10:2016 Standard Specification for Asphalt Concrete Pavement Construction" published by the Ministry of Land, Infrastructure and Transport, the process of repairing asphalt pavement is as follows. First, the surface of the asphalt or concrete base to be repaired is crushed and cleaned, and a tack coat is applied thereto and cured for a certain period of time. Next, new asphalt is paved and subjected to a compaction process. The tack coat is applied in order to improve the adhesion of an asphalt mixture to an existing asphalt layer or cement concrete pavement. The tack coat is mainly based on an asphalt emulsion, and serves to increase the adhesion between the upper layer of existing pavement (base layer) and a surface layer (new asphalt layer), prevent water or foreign substances from penetrating into the base layer, give waterproof properties, and increase the strength of pavement by increasing cohesion. The application of the asphalt emulsion is one of the processes that greatly affect the service life of the road.

However, a curing time of 1 to 2 hours or more after application of the tack layer is required, and if paving is performed before completion of curing of the tack coat, the tack coat will be damaged due to the movement of a dump truck or paving equipment on the tack coat, and as a result, the durability of the asphalt pavement will be degraded, thereby reducing the service life of the road.

As technology for protecting the tack coat, technology of incorporating a film or the like in an asphalt reinforcement for use in an asphalt repair process is known.

Korean Patent No. 10-1427375 discloses an asphalt reinforcement including a breathable polyethylene film layer on one or both sides of a reinforcing fiber layer.

The above patent is a patent related to asphalt reinforcement, and has an effect of reducing the overall repair cost by the asphalt reinforcement effect. However, the initial costs such as the reinforcement material cost and installation cost increase, and the asphalt reinforcement is applied to only 5% or less of the total repair section, indicating that the asphalt reinforcement has limited advantages. In addition, the breathable film used in the above patent is composed of polyethylene and inorganic materials to achieve breathability, and when the film is melted at the temperature of asphalt, the inorganic material included in the film forms a layer. Thus, the film serves to protect the asphalt emulsion layer and maintain adhesion, but does not seem to exhibit the effect of increasing adhesion.

In addition, Korean Patent No. 10-1822875 discloses an asphalt reinforcement including low-melting-point fiber that melts at 90 to 140° C. Here, a woven or non-woven fabric obtained by impregnating the low-melting-point fiber with an asphalt emulsion is integrated with a tack coat layer by melting at a temperature at which an upper asphalt layer is paved.

However, the above patent has disadvantages in that, since the surface of the nonwoven fabric impregnated with the asphalt emulsion is exposed to the outside, the viscosity of the impregnated asphalt emulsion is exposed to the outside, and thus the asphalt emulsion sticks to the wheels of construction equipment, causing a breakdown of the construction equipment, or the asphalt emulsion does not play its role.

DISCLOSURE

Technical Problem

Therefore, an object of the present invention is to provide a cover for asphalt, which may serve as an adhesive between new and existing asphalt pavements in the absence of application of a tack coat and prevent the breakdown of heavy vehicles for paving a new asphalt layer.

Another object of the present invention is to provide a cover for asphalt, which completely melts at a paving temperature in a new asphalt-paving process without leaving residue and has convenient applicability and excellent workability.

Still another object of the present invention is to provide a method of paving asphalt using the cover for asphalt without tack coat application.

Technical Solution

The above objects are accomplished by a cover for asphalt to be disposed between an upper surface of an existing asphalt layer and a new asphalt layer, the cover for asphalt including: a film layer which has a basis weight of 10 to 50 g/m² and a melting point of 90 to 130° C.; and a nonwoven fabric layer which is attached to one surface of the film layer, has a melting point of 50 to 130° C., and is impregnated with an asphalt emulsion, wherein the asphalt emulsion contains, based on the total weight of the emulsion, 60 to 70 wt % of modified asphalt, 1.0 to 5.0 wt % of a curing agent, 0.01 to 0.1 wt % of an anti-stripping agent, 1.0 to 5.0 wt % of petroleum resin, 5.0 to 10.0 wt % of latex, 0.1 to 2.0 wt % of a fatty acid amine salt, 0.1 to 2.0 wt % of calcium chloride, 0.1 to 1.0 wt % of hydrochloric acid, 1.0 to 10.0 wt % of a thickener, and 20 to 30 wt % of water.

Preferably, the film layer may include at least one resin selected from the group consisting of polypropylene, polyethylene, ethylene vinyl acetate, polyethylene elastomers, polypropylene elastomers, polybutene, and thermoplastic polyurethane, and may be breathable or non-breathable, and the nonwoven fabric layer may include at least one nonwoven fabric selected from the group consisting of polyethylene spunbond nonwoven fabric, polyethylene melt-blown nonwoven fabric, copolyamide TBCW nonwoven fabric, copolyamide melt-blown nonwoven fabric, polypropylene TBCW nonwoven fabric, polypropylene melt-blown nonwoven fabric, ethylene vinyl acetate TBCW nonwoven fabric, and ethylene vinyl acetate melt-blown nonwoven fabric.

Preferably, the nonwoven fabric layer may be impregnated with the asphalt emulsion in an amount of 50 to 650 g/m².

Preferably, the cover for asphalt may be disposed so that the nonwoven fabric layer faces the upper surface of the existing asphalt layer and the film layer faces the new asphalt layer.

The above objects are also accomplished by a method for paving asphalt including steps of: cleaning a surface of a base on which new asphalt is to be paved or which is to be repaired; disposing the cover for asphalt; paving new asphalt on the cover for asphalt; and compacting and curing.

Advantageous Effects

The cover for asphalt according to the present invention may be provided on an existing asphalt layer during asphalt pavement construction to prevent the asphalt emulsion from being lost by the entry and exit of heavy vehicles or construction equipment, prevent the asphalt emulsion from being washed out by rain, snow, etc. during asphalt pavement construction, and block the infiltration of foreign substances. In addition, the use of the cover for asphalt may increase the tensile adhesive strength between a base layer (existing asphalt layer) and a new asphalt layer, thereby increasing the deformation resistance of the surface layer and suppressing damage such as potholes. In addition, the cover for asphalt according to the present invention has low initial cost burden due to low material and construction costs, and thus may be applied to the entire section of asphalt pavement, so that the effect of the asphalt emulsion may be applied to the entire section.

BRIEF DESCRIPTION OF DRAWINGS

FIG. 3 shows the result of measuring the melting point of a polyethylene-based spunbond nonwoven fabric.

FIG. 4 shows the result of measuring the melting point of a linear low-density polyethylene film in Experimental Example 5.

MODE FOR INVENTION

Figures 1, 2:
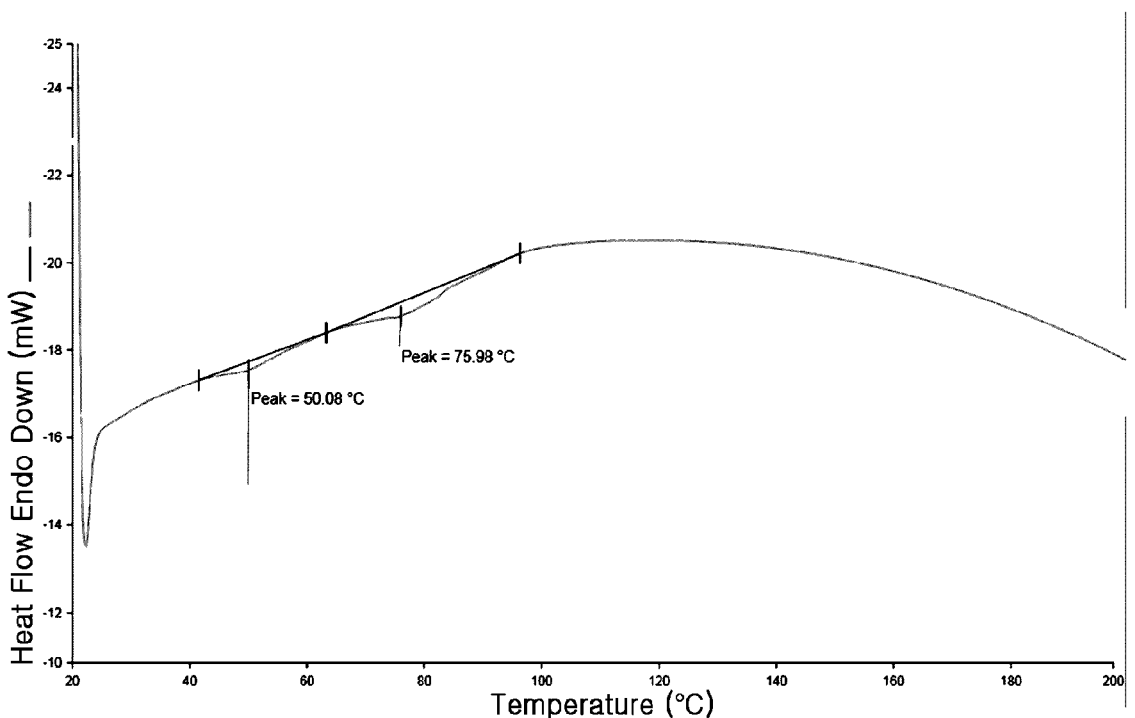
FIG. 1 is a graph showing the result of measuring the melting point of a nonwoven fabric used in a nonwoven fabric layer of a cover for asphalt according to the present invention.
FIG. 2 shows the result of measuring the melting point of a linear low-density polyethylene film in Experimental Example 4.

Unless otherwise defined, all technical terms used in the present invention have the same meanings as commonly understood by those skilled in the art to which the present invention pertains. In addition, although preferred methods or samples are described herein, those similar or equivalent thereto are also within the scope of the present invention.

The term "about" refers to an amount, level, value, number, frequency, percentage, dimension, size, amount, weight or length that varies by as much as 30, 25, 20, 15, 10, 9, 8, 7, 6, 5, 4, 3, 2 or 1% to a reference amount, level, value, number, frequency, percentage, dimension, size, amount, weight or length.

Throughout the present specification, unless the context requires otherwise, the words "includes," "include," and "including" will be understood to imply the inclusion of a stated step or element or group of steps or elements but not the exclusion of any other step or element or group of steps or elements.

The present invention relates to a cover for asphalt. The asphalt cover includes a film layer and a nonwoven fabric layer impregnated with an asphalt emulsion, and optionally an adhesive layer formed between the film layer and the nonwoven fabric layer.

The film layer may be a film formed of a resin having a melting point of 50 to 130° C. Preferably, the film may include at least one resin selected from the group consisting of polypropylene, polyethylene, ethylene vinyl acetate, polyethylene elastomers (POE), polypropylene elastomers (POP), polybutene, and thermoplastic polyurethane. In general, polypropylene is known to have a melting point of 160° C., but in the present invention, a film having a melting point of 50 to 130° C. may be produced by selecting and using low-molecular-weight polypropylene or using homo-polypropylene. According to another embodiment of the present invention, the film layer may include a polyethylene resin having a melting point of 90 to 130° C.

According to an embodiment of the present invention, the film may be breathable or non-breathable.

When the film is a breathable film, it may be produced by mixing, based on the total weight of the film, 70 to 40 wt % of a resin having a melting point of 50 to 130° C. and 30 to 60 wt % of an inorganic material. The inorganic material may be at least one selected from the group consisting of calcium carbonate, magnesium carbonate, magnesium sulfate, barium sulfate, calcium carbonate, magnesium carbonate, magnesium sulfate, barium sulfate, titanium oxide, alumina, aluminum hydroxide, magnesium hydroxide, diatomaceous earth, and clay. Preferably, an inorganic material having an average particle diameter of 1.1 to 4.0 μm, more preferably 1.5 to 3.0 μm, may be used. The inorganic material serves to provide breathability by forming pores. If the average particle diameter of the inorganic material is less than 1.1 μm, good breathability may not be obtained, and an overload may be applied to extrusion equipment during production, thereby shortening the life of the equipment. If the average particle diameter of the inorganic material is greater than 4.0 μm, defects in quality, such as tearing, hole generation, and strength reduction, may occur in the film production process.

When the breathable film is used, residual heat or gas generated in the asphalt emulsion curing process may pass through the cover, thereby shortening the curing time. However, when the breathable film is applied, the inorganic layer may limit the effect of increasing the adhesion of the asphalt emulsion layer. For this reason, it is preferable to use a breathable film having a reduced content of the inorganic material.

The film may be produced by a known film production method, such as a casting method, a T-die extrusion, or a blown extrusion method. More preferably, the film may be produced by a casting method.

According to an embodiment of the present invention, the surface of the film may be subjected to plasma surface treatment to increase the adhesion thereof to the asphalt emulsion. The plasma surface treatment may be performed using a known method.

According to an embodiment of the present invention, the melting point of the film layer may be 50° C. to 150 C, preferably 90° C. to 130° C. Since the application temperature of asphalt is usually 120° C. or higher, the film layer of the present invention, which has a melting temperature lower than the application temperature of asphalt, may be removed by the heat of the asphalt mixture in an asphalt paving process without using a separate heating device.

In addition, the basis weight of the film layer may be 10 to 50 g/m². If the basis weight of the film layer is less than 10 g/m², the film may not function because it is easily torn by external forces such as wheels of construction equipment because of its low tensile strength. If the basis weight of the film layer is more than 50 g/m², phenomena such as tearing will not occur, but the film layer may act to reduce the viscosity and adhesion of the asphalt emulsion, thereby limiting the function of the asphalt emulsion. Thermoplastic resins (PE, PP, etc.) have an effect flowability due to their high intermolecular bonding force, but an asphalt emulsion is absolutely necessary to increase the adhesion between aggregates.

In addition, the film layer according to the present invention may further include an antioxidant, an anti-blocking agent and a slip agent.

The nonwoven fabric layer may be attached to one surface of the film layer.

The nonwoven fabric layer may include at least one resin selected from the group consisting of polypropylene, polyethylene, copolyamide, ethylene vinyl acetate, polyethylene elastomers (POE), polybutene, and thermoplastic polyurethane. According to one embodiment of the present invention, the melting point of the nonwoven layer may be 50 to 150° C., preferably 50 to 130° C. In general, polypropylene and polyamide have melting points of 160° C. and 220° C., respectively, but in the present invention, a nonwoven fabric having a melting point of 50 to 130° C. may be produced by selecting and using a low-molecular-weight polypropylene or a low-molecular-weight polyamide copolymer.

The nonwoven fabric may be spunbond nonwoven fabric, melt-blown nonwoven fabric, TBCW (through bonded carded web) nonwoven fabric, TABCW (through air bonded carded web) nonwoven fabric, or spunlace nonwoven fabric. Preferably, the nonwoven fabric may be melt-blown nonwoven fabric or TBCW nonwoven fabric.

Preferably, the nonwoven fabric layer may have a basis weight of 10 to 50 g/m². If the basis weight of the nonwoven fabric layer is less than 10 g/m², problems may arise in that the void space of the nonwoven fabric layer is narrow, and thus the nonwoven fabric layer does not serve to absorb and protect the asphalt emulsion. In addition, a problem may arise in that the nonwoven fabric layer is torn by an external force because of its low tensile strength. If the basis weight of the nonwoven fabric layer is more than 50 g/m², the viscosity and adhesion of the asphalt emulsion may be reduced, thereby limiting the function of the asphalt emulsion, thereby reducing the adhesion between aggregates.

In the present invention, the nonwoven fabric layer is characterized in that it is impregnated with the asphalt emulsion.

The asphalt emulsion is prepared by mixing a first emulsion and a second emulsion using a colloid mill, wherein the first emulsion contains modified asphalt, a curing agent, an anti-stripping agent, and petroleum resin, and the second emulsion contains latex, a fatty acid amine salt, calcium chloride, hydrochloric acid, a thickener, and water. The modified asphalt is defined by an asphalt modified with SBS.

According to an embodiment of the present invention, the asphalt emulsion may contain, based on the total weight of the emulsion, 60 to 70 wt % of the modified asphalt, 1.0 to 5.0 wt % of the curing agent, 0.01 to 0.1 wt % of the anti-stripping agent, 0.1 to 5.0 wt % of petroleum resin, 5.0 to 10.0 wt % of latex, 0.1 to 2.0 wt % of the fatty acid amine salt, 0.1 to 2.0 wt % of calcium chloride, 0.1 to 1.0 wt % of hydrochloric acid, 1.0 to 10.0 wt % of the thickener, and 20 to 30 wt % of water.

The curing agent may be a 1:1 (w/w) mixture of a glycerin compound and a resin acid. The curing agent is preferably contained in an amount of 1.0 to 5.0 wt % based on the total weight of the asphalt emulsion. If the content of the curing agent is less than 1.0 wt %, the curing time of the asphalt emulsion may increase, and thus the asphalt emulsion may not be cured in a step of producing the cover, thereby delaying the production process, and the production cost may be increased if an additional drying device is installed. If the content of the curing agent is more than 5.0 wt %, the curing time may be excessively shortened, and thus the emulsion may be cured in an impregnation bath before being impregnated into the nonwoven fabric, which may make continuous production difficult.

Preferably, the thickener may be methyl cellulose. The thickener is preferably contained in an amount of 1.0 to 10.0 wt % based on the total weight of the asphalt emulsion. If the content of the thickener is less than 1.0 wt %, the asphalt emulsion may not adhere well to not only an impregnating roll but also the nonwoven fabric due to its low viscosity. If the content of the thickener is more than 10.0 wt %, the viscosity of the asphalt emulsion will be excessively high, and thus it may be difficult to uniformly impregnate the nonwoven fabric with the asphalt emulsion, and product defects may increase.

Methods that may be used to impregnate the nonwoven fabric with the asphalt emulsion include a method of impregnating the nonwoven fabric by placing the asphalt emulsion in a bath and immersing the nonwoven fabric in the bath, a spray coating method, or a kiss roll method of impregnating a rotating roll with the asphalt emulsion and then applying the asphalt emulsion while allowing the rotating roll to pass over the nonwoven fabric.

According to an embodiment of the present invention, the nonwoven fabric layer is a nonwoven fabric impregnated with the asphalt emulsion in an amount of 50 to 650 g/m².

According to an embodiment of the present invention, the nonwoven fabric may be impregnated with the asphalt emulsion in an amount of 50 to 350 $g/m^2$ for a non-cut surface and in an amount of 150 to 650 $g/m^2$ for a cut surface.

According to the "KCS 44 50 10:2016 Standard Specification for Asphalt Concrete Pavement Construction" published by the Ministry of Land, Infrastructure and Transport, the amount of bitumen (tack coat agent) applied during road paving is 0.3 to 0.6 $l/m^2$. Considering that conventional bitumen (tack coat agent) has a water content of about 50%, the actual solid content of the bitumen corresponds to 150 to 300 $g/m^2$.

The non-cut surface is the surface layer of concrete or asphalt road, and the surface layer of the road is clean and has a low porosity, and thus the tack coat is not lost after application thereof to the surface layer. Therefore, even if the tack coat agent is applied in an amount equal to the minimum value of the standard application amount range, the tack coat may sufficiently perform its function. Therefore, for the non-cut surface, a nonwoven fabric impregnated with the asphalt emulsion in an amount of 50 to 350 $g/m^2$ may be used.

In the case of the cut surface, dust or stone powder generated in the process of crushing a damaged surface layer may exist even after cleaning, and the loss of the tack coat agent by permeation is large because the base or intermediate layer has a high porosity. Therefore, in the present invention, a nonwoven fabric that is used for the cut surface is preferably impregnated with the asphalt emulsion in an amount of 150 to 650 $g/m^2$.

The nonwoven fabric layer impregnated with the asphalt emulsion may have a thickness of 0.1 to 5 mm.

The nonwoven fabric layer and the film layer may be laminated together before or after impregnation with the asphalt emulsion.

Lamination methods include a method of applying an adhesive to one surface of the film layer by a method such as liquid phase coating, microporous coating, slow coating, spray coating, or kiss roll coating, and then laminating the nonwoven fabric onto the film layer. The adhesive may be polyethylene, polypropylene, thermoplastic polyurethane, rubber such as SBS or SIS, EVA, POE, or the like, and the basis weight of the adhesive layer may be 0.5 to 15 $g/m^2$.

According to another embodiment, the film layer and the nonwoven fabric layer may be adhered to each other by a method such as thermal lamination or ultrasonic lamination.

According to another embodiment, it is possible to use a method of laminating the film layer and the nonwoven fabric together and then applying the asphalt emulsion thereto by spray coating, or a kiss roll method of applying the asphalt emulsion to a contacted roll and then applying the asphalt emulsion to one surface of the nonwoven fabric by the roll.

According to an embodiment of the present invention, the film layer and the nonwoven fabric layer may be adhered to each other using an adhesive. In this case, an adhesive layer is formed between the film layer and the nonwoven fabric layer. The adhesive may be polyethylene, polypropylene, thermoplastic polyurethane, rubber such as SBS or SIS, EVA, POE, or the like, and the basis weight of the adhesive layer may be 0.5 to 15 $g/m^2$.

According to another embodiment, the film layer and the nonwoven fabric layer may be adhered to each other by a method such as thermal lamination or ultrasonic lamination.

The cover for asphalt according to the present invention is used in a process of paving new asphalt repairing asphalt, and is disposed between the upper surface of a base layer or an existing asphalt layer and a new asphalt layer.

The process of repairing asphalt using the cover for protecting an asphalt emulsion according to the present invention is as follows.

First, the surface of an existing asphalt layer as a base is cleaned (S11). The surface of a road as the base may include an existing asphalt surface, a cut or flat asphalt surface, a concrete surface, a cut concrete surface, or an iron surface. The step of cleaning the surface of the base to remove foreign substances is performed to prevent the problem that the adhesion between the new and existing pavement layers is lowered due to foreign substances and the subsequent paving operation becomes inconvenient.

Next, the cover for asphalt is disposed on the existing asphalt layer (S12). In this case, the cover for asphalt may be disposed so that the nonwoven layer faces the existing asphalt layer and the film layer faces a new asphalt layer. The film layer serves to block the influence of the wheels of heavy vehicles such as construction equipment. Then, when a new asphalt mixture is paved, the asphalt emulsion impregnated in the nonwoven fabric layer is melted by the heat of the asphalt mixture and becomes viscose and sticky, and the nonwoven fabric layer and the film layer are melted and absorbed into the new asphalt mixture. Petrochemical materials such as polyethylene, polypropylene, and copolyamide, which are used in the film layer and the nonwoven fabric layer of the present invention, are melted and mixed with the asphalt emulsion and mixture and serve as a modifier for reducing flowability and suppressing deformation. However, the petrochemical materials have an adverse effect when they are used in excessive amounts. For this reason, the basis weight of each of the film layer and the nonwoven fabric layer is preferably 10 to 50 $g/m^2$.

Next, new asphalt is paved on the cover (S13). After completion of paving, compaction and curing are performed (S14). The new asphalt is preferably paved to a thickness of 20 to 110 mm, but the thickness may be adjusted depending on road conditions. In addition, the cover containing the asphalt emulsion may increase the tensile adhesive strength between a base layer (existing asphalt layer) and a new asphalt layer, thereby increasing the deformation resistance of the surface layer and suppressing the generation of potholes and the like. Hereinafter, the present invention will be described in more detail with reference to Examples and Comparative Examples, but the scope of the present invention is not limited by these Examples.

Experimental Example 1

To evaluate the curing time of the asphalt emulsion according to the present invention, three different asphalt emulsions having the compositions shown in Table 1 below were prepared and impregnated into nonwoven fabric specimens (copolyamide-based TBCW nonwoven fabric (melting point: 110° C. or lower, basis weight: 25 $g/m^2$), followed by a curing test. The results are shown in Table 2 below.

In the evaluation method, 1 liter of each of the emulsions of Example 1 and Comparative Examples 1 and 2 was placed in containers having the same size, and nonwoven fabric specimens having the same basis weight (50 $g/m^2$) and the same size (50 cm×50 cm) were prepared. Each nonwoven fabric specimen placed was in each container and impregnated with each asphalt emulsion for about 30 seconds. Next, the nonwoven fabric specimens were taken out and kept at a temperature of 25±2° C. and a humidity of 50±10%, and the curing time of each asphalt emulsion was measured.

TABLE 1

| | Example 1 (wt %) | Comparative Example 1 (wt %) | Comparative Example 2 (wt %) |
|---|---|---|---|
| Modified asphalt (PG76-22) | 65 | 55 | 73 |
| Water | Balance | Balance | Balance |
| Hydrochloric acid | 0.2 | 0.2 | 0.2 |
| Calcium chloride | 0.1 | 0.1 | 0.1 |
| Fatty acid amine salt | 0.1 | 0.1 | 0.1 |
| Glycerin compound and resin acid | 3.0 | 0.5 | 5.5 |
| Polyamine (anti-stripping agent) | 0.05 | 0.05 | 0.05 |
| Petroleum resin | 3.0 | 3.0 | 3.0 |
| Latex | 6.0 | 6.0 | 6.0 |
| Methyl cellulose (thickener) | 2.0 | 2.0 | 2.0 |
| Sum | 100 | 100 | 100 |

TABLE 2

| | Curing time (min) |
|---|---|
| Example 1-1 | 2.50 |
| Example 1-2 | 2.10 |
| Example 1-3 | 2.20 |
| Average of Example 1 | 2.26 |
| Comparative Example 1-1 | 3.75 |
| Comparative Example 1-2 | 3.54 |
| Comparative Example 1-3 | 3.28 |
| Average of Comparative Example 1 | 3.52 |
| Comparative Example 2-1 | 1.52 |
| Comparative Example 2-2 | 1.37 |
| Comparative Example 2-3 | 1.45 |
| Average of Comparative Example 2 | 1.44 |

Referring to Table 1 above, it can be confirmed that the curing time of the asphalt emulsion was 3.52 minutes for Comparative Example 1, but shorter than 2.5 minutes for Example 1.

Experimental Example 2

To evaluate the viscosity of the asphalt emulsion according to the present invention, three different asphalt emulsions having the compositions shown in Table 3 below were prepared and impregnated into nonwoven fabric specimens (copolyamide-based TBCW nonwoven fabric (melting point: 110° C. or lower, basis weight: 25 g/m²), followed by a curing test. The results are shown in Table 4 below. The viscosity of each asphalt emulsion was measured using a Brookfield viscometer. In the method and procedure, each liquid sample to be used in the test was placed in a sample chamber, and then aged at 25° C. for 30 minutes. The spindle of the Brookfield viscometer was immersed in the chamber containing each aged sample, and the sample was further aged at 25° C. for 30 minutes. Next, the viscosity value of each sample was measured using the Brookfield viscometer while adjusting the RPM.

TABLE 3

| | Example 1 (wt %) | Comparative Example 1 (wt %) | Comparative Example 2 (wt %) |
|---|---|---|---|
| Modified asphalt (PG76-22) | 65 | 55 | 73 |
| Water | Balance | Balance | Balance |
| Hydrochloric acid | 0.2 | 0.2 | 0.2 |
| Calcium chloride | 0.1 | 0.1 | 0.1 |
| Fatty acid amine salt | 0.1 | 0.1 | 0.1 |
| Glycerin compound and resin acid | 3.0 | 3.0 | 3.0 |
| Polyamine (anti-stripping agent) | 0.05 | 0.05 | 0.05 |
| Petroleum resin | 3.0 | 3.0 | 3.0 |
| Latex | 6.0 | 6.0 | 6.0 |
| Methyl cellulose (thickener) | 2.0 | 0.5 | 12.0 |
| Sum | 100 | 100 | 100 |

TABLE 4

| | Average viscosity (cP) |
|---|---|
| Example 1-1 | 103 |
| Example 1-2 | 105 |
| Example 1-3 | 101 |
| Average of Example 1 | 103 |
| Comparative Example 1-1 | 56 |
| Comparative Example 1-2 | 49 |
| Comparative Example 1-3 | 52 |
| Average of Comparative Example 1 | 52 |
| Comparative Example 2-1 | 303 |
| Comparative Example 2-2 | 299 |
| Comparative Example 2-3 | 301 |
| Average of Comparative Example 2 | 301 |

Referring to Table 4 above, it can be confirmed that, in the case of Comparative Example 1 in which the content of the thickener was 0.5 wt % and the content of the modified asphalt was 55 wt %, the average viscosity was only 52 cP, and in Comparative Example 2 in which the content of the thickener was 12 wt % and the content of the modified asphalt was 73 wt %, the average viscosity was as high as 301 cP.

Experimental Example 3

In order to evaluate curing of the asphalt emulsion according to the present invention, three different asphalt emulsions having the compositions shown in Table 3 above were prepared and impregnated into nonwoven fabric specimens, followed by a curing test. The results are shown in Table 5 below.

In the evaluation method, the emulsions of Example 1 and Comparative Examples 1 and 2 shown in Table 3 above were used as asphalt emulsions. 50 liters of each asphalt emulsion were placed in each bath. The following laminates were prepared: a laminate of a copolyamide-based TBCW (through bonded carded web) non-woven fabric (melting point: 110° C. or lower, 25 g/m²) and a linear low-density polyethylene film (melting point: 110° C., non-breathable, 20 g/m²); and a laminate of a copolyamide-based TBCW (through bonded carded web) nonwoven fabric (melting point: 110° C. or lower, and 45 g/m²) and a linear low-density polyethylene film (melting point: 110° C., non-breathable, 20 g/m²). The nonwoven fabric and the film were laminated together to have a width of 1.8 m, and the nonwoven fabric was impregnated with the asphalt emulsion while moving at a speed of 2 m/min by a kiss roll method. During the test, the drying and curing section was 10 m, and in a 2 m section thereof, each asphalt emulsion was dried by heating to a surface temperature of about 100° C.

TABLE 5

| | Example 1-1 | Example 1-2 | Comp. Example 1-1 | Comp. Example 1-2 | Comp. Example 2-1 | Comp. Example 2-2 |
|---|---|---|---|---|---|---|
| Film (g/m²) | 20 | 20 | 20 | 20 | 20 | 20 |
| Nonwoven fabric (g/m²) | 25 | 45 | 25 | 45 | 25 | 45 |
| Asphalt emulsion | Example 1 | Example 1 | Comp. Example 1 | Comp. Example 1 | Comp. Example 2 | Comp. Example 2 |
| Viscosity (cP) | 103 | 103 | 52 | 52 | 301 | 301 |
| Amount impregnated (ml/m²) | 237 | 338 | 42 | 48 | 726 | 794 |
| Curing level | Good | Good | Over-dried (film melted) | Over-dried (film melted) | Not cured | Not cured |
| Use as product | Possible | Possible | Impossible | Impossible | Impossible | Impossible |

Referring to Table 5 above, it can be confirmed that, when the nonwoven fabric was impregnated with the asphalt emulsion of Example 1, the curing level of the asphalt emulsion was good, and the impregnated structure was usable as a product. However, it was confirmed that, when the nonwoven fabric was impregnated with the asphalt emulsion of Comparative Example 1, the film and the nonwoven fabric were over-dried to the extent to which the film and the nonwoven fabric were melted during the drying and curing process at 100° C., and commercialization of the impregnated structure was impossible. In addition, it was confirmed that, when the nonwoven fabric was impregnated with the asphalt emulsion of Comparative Example 2, the asphalt emulsion was impregnated into the nonwoven fabric in an excessively large amount due to its excessively high viscosity and was not cured, and commercialization of the impregnated structure was impossible.

Experimental Example 4: Measurement of Melting Point of Cover for Asphalt

A copolyamide-based TBCW (through bonded carded web) nonwoven fabric (melting point: 110° C. or lower; 25 g/m²) was impregnated with the asphalt emulsion (the amount of asphalt emulsion impregnated: 237 g/m²) of Example 1, and then laminated with a linear low-density polyethylene film (melting point: 110° C.; non-breathable, 20 g/m²) using an adhesive. As the adhesive, an SBS rubber-based liquid adhesive was used.

The melting point of the nonwoven fabric before impregnation with the asphalt emulsion was measured, and the result is shown in FIG. 1. Referring to FIG. 1, it was confirmed that the nonwoven fabric had a melting point of 50.08° C. to 75.98° C.

FIG. 2 shows the result of measuring the melting point of the linear low-density polyethylene film. Referring to FIG. 2, it was confirmed that the melting point of the linear low-density polyethylene film was 110.4° C. The above results suggest that the melting point of the cover for asphalt according to the present invention is 110° C. or lower.

Experimental Example 5: Measurement of Melting Point of Cover for Asphalt

A polyethylene-based spunbond nonwoven fabric (melting point: 130° C. or lower; 20 g/m²) was impregnated with the asphalt emulsion (the amount of asphalt emulsion impregnated: 120 g/m²), and then laminated with a linear low-density polyethylene film (melting point: 125° C.; breathable, 20 g/m²; inorganic material content: 50 wt %) using an adhesive. As the adhesive, an SBS rubber-based liquid adhesive was used.

The melting point of the nonwoven fabric was measured, and the result is shown in FIG. 3. Referring to FIG. 3, it was confirmed that the melting point of the nonwoven fabric was 129.8° C.

FIG. 4 shows the result of measuring the melting point of the linear low-density polyethylene film. Referring to FIG. 4, it was confirmed that the melting point of the linear low-density polyethylene film was 123.5° C. The above results suggest that the melting point of the cover for asphalt according to the present invention is 130° C. or lower.

Figure 5:
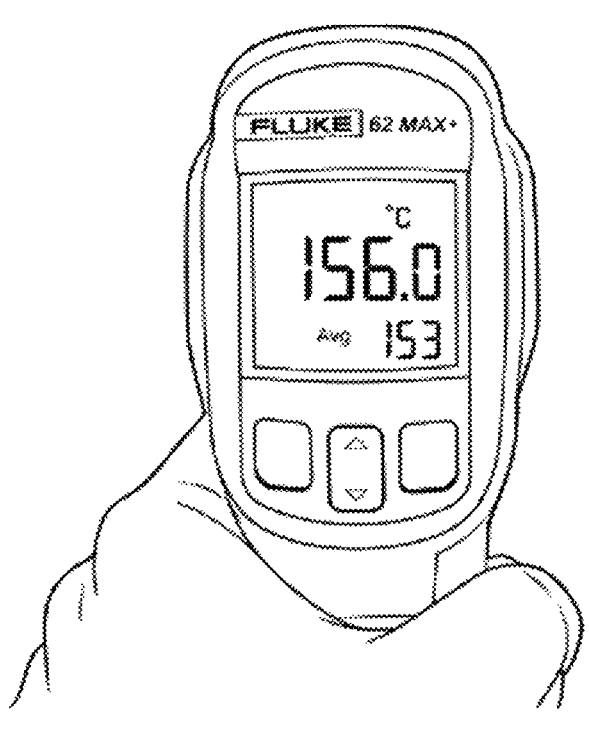
FIG. 5 shows a surface temperature measured for the pavement surface during asphalt pavement.

FIG. 5 shows a surface temperature measured for the pavement surface during asphalt pavement. Referring to FIG. 5, it can be seen that the melting point of the cover for protecting an asphalt emulsion is preferably 150° C. or lower.

Experimental Example 6: Measurement of Tensile Adhesive Strength

Tensile adhesive strength was measured according to the standard KS F 4932:2017. The KS standard relates to "coating waterproofing material for concrete bridge surfaces", and is the standard by which various tests for bridges, such as tests for tensile adhesive strength and shear adhesive strength between layers in the bridge section, water permeability resistance, cracking resistance, etc. are conducted.

In the test method, a test specimen cured for 168 hours was kept at a test temperature (20° C.) for 1 hour, and then a tensile force was applied vertically to the surface of the test specimen using a universal tensile tester, and the maximum tensile load was measured. The grade of the asphalt mixture used was WC-2 13-mm grade. In preparation of the test specimen, the first layer was deposited on a square frame (width×length=30 cm×30 cm) to have a thickness of 25 mm and compacted, and then the cover for asphalt prepared in Experimental Example 3 was disposed thereon. Thereafter, a second layer was deposited thereon to have a thickness of 25 mm and compacted, thereby forming a two-layer asphalt mixture specimen. This specimen was drilled to have a circular core with a diameter of 100 mm, thus preparing a final test specimen for measuring tensile adhesive strength.

As Comparative Example 1 (untreated), a comparative specimen was prepared by depositing the second layer directly on the first layer without applying the asphalt emulsion, followed by compaction. As Comparative Example 2 (existing road condition), a comparative specimen was prepared in the same manner as the test specimen, except that the cover for asphalt was not disposed after the asphalt emulsion was applied onto the first layer.

The adhesive strengths of the test specimen and the comparative specimens were measured, and the results are shown in Table 6 (comparison of tensile adhesion strength (20° C.) between the paving methods).

TABLE 6

| | Test specimen (Experimental Example 3) | Comparative Example 1 | Comparative Example 2 | Unit |
|---|---|---|---|---|
| Tensile adhesive strength of asphalt mixture | 0.91 | 0.47 | 0.86 | N/mm$^2$ |

Referring to Table 5, the adhesive strength of the test specimen including the cover for asphalt according to the present invention was about 50% higher than that of the specimen of Comparative Example 1. In addition, the adhesive strength of the test specimen was equal to or higher than that of the specimen of Comparative Example 2, which is an existing road condition using the tack coat. Thereby, it was confirmed that the cover for asphalt according to the present invention increases the adhesive strength between an existing asphalt layer and a new asphalt layer. The use of the cover for asphalt according to the present invention may eliminate the need for a conventional asphalt emulsion application process, increase the deformation resistance of the surface layer, and suppress pavement damage such as potholes.

The invention claimed is:

1. A cover for asphalt to be disposed between an upper surface of an existing asphalt layer and a new asphalt layer, the cover for asphalt comprising:
a film layer having a basis weight of 10 to 50 g/m$^2$ and a melting point of 90 to 130° C.; and
a nonwoven fabric layer impregnated with an asphalt emulsion in an amount of 50 to 650 g/m$^2$ and attached to one surface of the film layer, the nonwoven fabric layer having a melting point of 50 to 130° C.,
wherein the asphalt emulsion contains, based on a total weight of the asphalt emulsion, 60 to 70 wt % of a modified asphalt, 1.0 to 5.0 wt % of a curing agent, 0.01 to 0.1 wt % of an anti-stripping agent, 1.0 to 5.0 wt % of a petroleum resin, 5.0 to 10.0 wt % of a latex, 0.1 to 2.0 wt % of a fatty acid amine salt, 0.1 to 2.0 wt % of a calcium chloride, 0.1 to 1.0 wt % of a hydrochloric acid, 1.0 to 10.0 wt % of a thickener, and 20 to 30 wt % of water, and
wherein the nonwoven fabric layer is formed of a copolyamide TBCW nonwoven fabric or a copolyamide melt-blown nonwoven fabric.

2. The cover for asphalt according to claim 1, wherein the film layer comprises at least one resin selected from the group consisting of polypropylene, polyethylene, ethylene vinyl acetate, polyethylene elastomers, polypropylene elastomers, polybutene, and thermoplastic polyurethane, and is breathable or non-breathable.

3. The cover for asphalt according to claim 1, wherein the nonwoven fabric layer faces the upper surface of the existing asphalt layer and the film layer faces the new asphalt layer.

4. A method for paving asphalt comprising steps of:
cleaning a surface of a base on which new asphalt is to be paved or which is to be repaired;
disposing the cover for asphalt according to claim 1;
paving new asphalt on the cover for asphalt; and
compacting and curing.

* * * * *